(No Model.)
J. A. EICHER.
FISHING ROD SUPPORT.
No. 567,084. Patented Sept. 1, 1896.
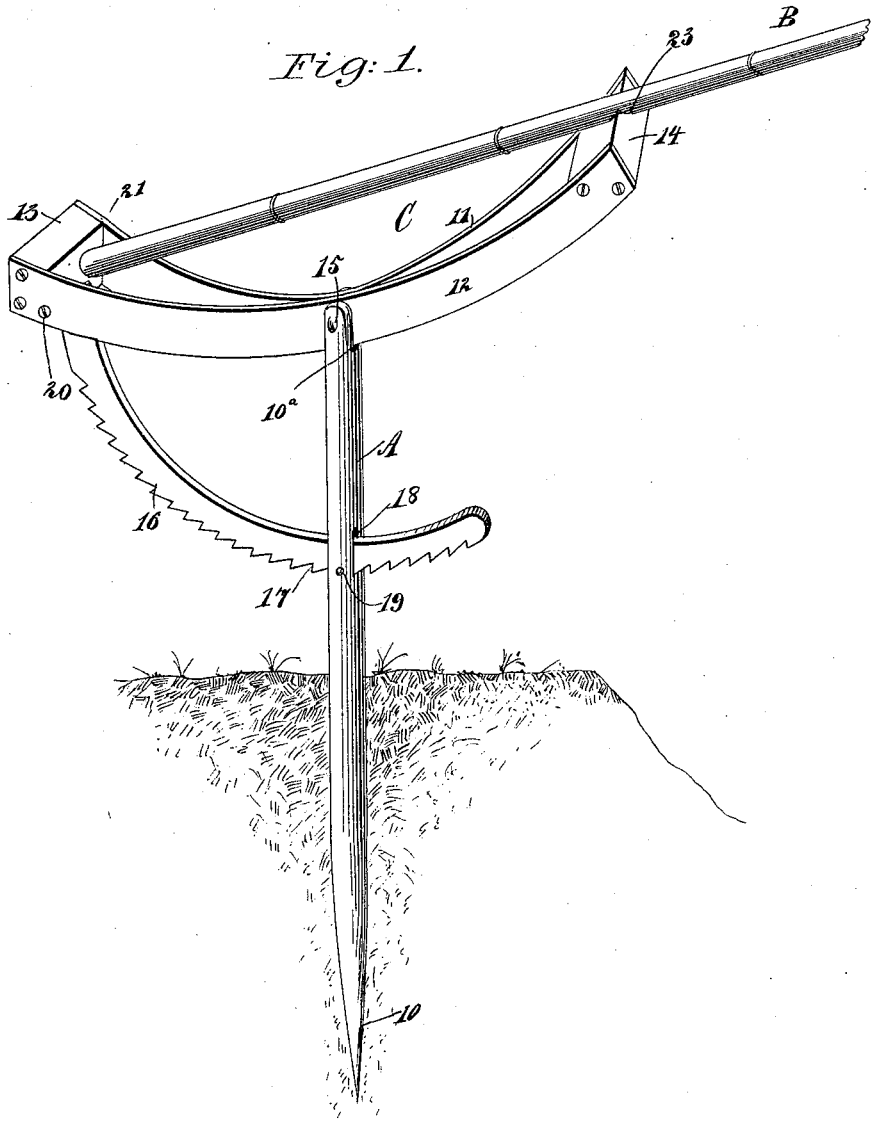
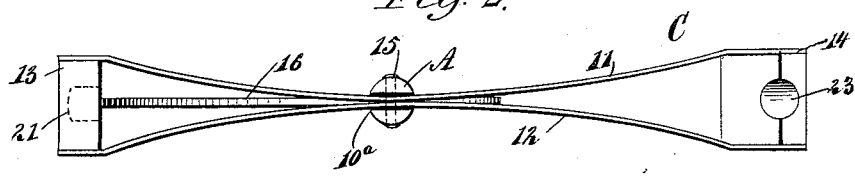
WITNESSES:
INVENTOR
J. A. Eicher
BY
ATTORNEYS.

UNITED STATES PATENT OFFICE.

JACOB A. EICHER, OF TRENTON, ILLINOIS.

FISHING-ROD SUPPORT.

SPECIFICATION forming part of Letters Patent No. 567,084, dated September 1, 1896.

Application filed May 11, 1896. Serial No. 591,093. (No model.)

*To all whom it may concern:*

Be it known that I, JACOB A. EICHER, of Trenton, in the county of Clinton and State of Illinois, have invented a new and Improved Fisherman's Pole-Rest, of which the following is a full, clear, and exact description.

My invention relates to devices especially adapted for supporting a fishpole adjacent to the banks of rivers, creeks, and other small bodies of water.

The object of the invention is to provide a rest for a fishpole which will be simple, economic, and durable in its construction, and which may be folded up so as to occupy but a small space in transportation.

Another object of the invention is to provide for the adjustment of the device in a convenient and expeditious manner, enabling the pole held by the device to be raised or lowered at the will of the operator.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1 is a perspective view of the improved device, and Fig. 2 is a plan view of the same.

In carrying out the invention a stake A is employed, which at its upper end is provided with a vertical slot $10^a$, and its lower end 10 is sharpened, so that the stake may be driven into the ground to any desired depth necessary for the support of the fishing-pole B.

A cradle C is supported by the stake A, and this cradle consists of two side pieces 11 and 12, which are curved to present a concaved upper edge, and the two side pieces are brought practically close together at a point near their centers, the ends of the said side pieces being carried in opposite directions, and the said end portions are connected by blocks 13 and 14, while at one side of the center, where the side pieces are brought together, the cradle is introduced into the slot $10^a$ of the stake, and a pivot-pin 15 is passed through the slotted portion of the stake and through the cradle, as is shown in both of the views. This pivot-pin is removable, in order that the cradle and the stake may be brought close together for transportation.

A curved latch-bar 16 is connected with the cradle, and the under face of the said latch-bar is convexed and provided with teeth 17, having a rearward inclination, and the toothed portion of the latch-bar is passed through a slot 18, made in the said stake A, and the teeth are adapted, preferably, for engagement with a pin 19, which is passed through the stake and across the slot 18, as shown in Fig. 1.

The upper end of the latch-bar is pivoted upon a cross-bar 20, which is passed through the cradle at its rear end block 13. The preponderance of weight of the cradle is at its forward end, so that when the cradle is not supporting a fishing-rod the teeth of the latch-bar will still be held in engagement with the pin 19.

An aperture or an opening 21 is diagonally made in the rear block 13 of the cradle, adapted to receive the heel of the fishing-rod B, and in the upper central portion of the forward block 14 of the cradle a cavity or a recess 23 is made, in which the aforesaid fishing-pole rests.

When it is desired to raise the fishing-pole, all that is necessary is to push downward on the rear end of the cradle. When the fishing-pole is to be lowered, however, the latch-bar 16 is raised from engagement with the pin 19, permitting the forward end of the cradle to drop, and in this manner the fishing-pole may be dropped as far as may be desired.

It is evident that the pole will be supported by the device, leaving the fisherman perfectly free during the interim between bites.

Having thus described my invention, I claim as new and desire to secure by Letters Patent—

1. The combination, with a support, of a curved cradle pivoted to the said support, provided with a socket near one end to receive a fishing-rod and a support for the same near the opposite end, a toothed bar pivoted to the cradle, and a keeper located upon the said support and adapted for engagement with the said toothed bar, as and for the purpose specified.

2. A support for a fishing-pole or like device, consisting of a stake adapted to be introduced into the ground, a cradle pivoted in the upper portion of the stake, the said cradle having a concaved upper edge, being provided at one end with a socket and at the opposite end with a supporting-block, and a curved toothed bar pivotally connected with the cradle near one end, the opposite end of the said bar being passed through a slot in the stake, the teeth of the bar being arranged for engagement with a keeper located upon the stake, as and for the purpose set forth.

3. A support for fishing-rods and like devices, consisting of a stake adapted to be driven in the ground, a cradle pivoted at the rear of its center in the upper portion of the said stake, the said cradle being provided at its rear end with a socket to receive the heel of a fishing-rod, the opposite end having a bearing as a support for the rod, and an arched bar pivotally connected with the rear portion of the cradle, having teeth upon its lower convexed edge, the free end of the bar being passed through an opening in the stake in such manner as to bring the teeth in engagement with a keeper connected with the stake, as and for the purpose specified.

4. A support for fishing-rods or for similar purposes, comprising a stake, a cradle having a concaved upper face and comprising side pieces diverging at their ends and brought together at a point near their centers, the said cradle being pivoted in the stake at a point at the rear of its center, a cross-bar located at the rear end of the cradle, having a socket formed therein, a recessed cross-bar located at the forward end of the center, adapted as a support for a rod intermediate of its length, a curved latch-bar pivotally attached to the rear portion of the said cradle, its free end being toothed upon its under convexed edge, the teeth being rearwardly inclined and the free end of the said latch-bar being also passed through an opening in the stake, and a keeper located within the stake-opening, and arranged for engagement with the teeth of the said latch-bar, substantially as shown and for the purpose specified.

JACOB A. EICHER.

Witnesses:
FRED H. KURTZ,
CHARLES SCHAEFFER.